United States Patent [19]
Truong

[11] Patent Number: 5,665,974
[45] Date of Patent: Sep. 9, 1997

[54] SELF-MONITORING OPTICAL ENCODER FOR WAVELENGTH DIVISION MULTIPLEXING OPTICAL SENSORS

[75] Inventor: Tuong Kien Truong, Renton, Wash.

[73] Assignee: The Boeing Company, Seattle, Wash.

[21] Appl. No.: 559,543

[22] Filed: Nov. 16, 1995

[51] Int. Cl.[6] .................................................. G06K 7/10
[52] U.S. Cl. ................... 250/555; 250/566; 250/231.18; 341/13
[58] Field of Search ..................... 250/555, 556, 250/568, 569, 570, 230, 231.1, 231.18; 341/13, 14; 235/437, 494

[56] References Cited

U.S. PATENT DOCUMENTS

| | | |
|---|---|---|
| 2,966,671 | 12/1960 | Abbott et al. . |
| 3,757,090 | 9/1973 | Haefeli et al. . |
| 3,831,009 | 8/1974 | McMillin ................................ 250/555 |
| 3,842,401 | 10/1974 | Smith, Jr. et al. . |
| 3,878,399 | 4/1975 | Higuchi et al. . |
| 3,891,143 | 6/1975 | Haeusler . |
| 3,913,094 | 10/1975 | Wootton, III . |
| 4,146,873 | 3/1979 | Yamanaka et al. . |
| 4,173,752 | 11/1979 | Yamanaka . |
| 4,315,252 | 2/1982 | Tagami .............................. 250/231.18 |
| 4,384,204 | 5/1983 | Tamaki et al. ..................... 250/231.18 |
| 4,597,081 | 6/1986 | Tassone . |
| 4,633,224 | 12/1986 | Gipp et al. . |
| 4,933,673 | 6/1990 | Ishizuka et al. ........................ 341/13 |

FOREIGN PATENT DOCUMENTS

52-76825  6/1977  Japan .

Primary Examiner—Edward P. Westin
Assistant Examiner—Kevin Pyo
Attorney, Agent, or Firm—Christensen, O'Connor, Johnson & Kindness PLLC

[57] ABSTRACT

A self-monitored optical sensor having a code plate having a plurality of tracks disposed thereon. Each of the tracks comprises a pattern of reflective and absorptive segments that form a code that is indicative of a discrete position of the code plate. The code plate further includes a monitoring track that encodes a number of expected absorptive or reflective segments in the code plate at each discrete position. A detector circuit compares the number of absorptive or reflective segments detected and the number of expected absorptive or reflective segments in order to determine if there is a fault in the code plate.

11 Claims, 5 Drawing Sheets

SELF-MONITORING OPTICAL ENCODER FOR WAVELENGTH DIVISION MULTIPLEXING OPTICAL SENSORS

FIELD OF THE INVENTION

The present invention relates to optical sensors in general, and in particular, to optical sensors having built-in fault detection to validate the integrity of its operational measurand.

BACKGROUND OF THE INVENTION

In any modern aircraft, a variety of sensors are used to alert the pilot and crew to virtually every aspect of the aircraft's operating condition. For example, sensors are used to determine the position of the pilot's controls, the position of the flight control surfaces, the position of the landing gear, the amount of fuel remaining, the aircraft's speed etc. Traditionally, a sensor comprised an electromechanical device that produced an analog signal indicative of the parameter being sensed. The analog signals were transmitted over a copper wire to an onboard aircraft computer where they were converted into a corresponding digital signal and analyzed.

With advances in fiber optic technology, many older analog sensing systems are being replaced with digital optical sensors. A digital sensor can provide an absolute reading of a measurand in the presence of system noise and transmission path instability that is far more precise than could be obtained with an analog sensor. A typical optical sensor includes a light source, a fiber optic cable that carries light from the light source and a code plate that is coupled to the object whose position is to be sensed. The code plate has a pattern of nonreflective (absorptive) and reflective segments on it. Light striking the code plate is reflected back to a decoder at certain wavelengths, which are analyzed to provide an indication of the position of the object. Three of the most important advantages of optical sensors over the prior art analog sensors are the fact that they are lightweight, don't require electrical power into the sensor, and that the fiber optic cables are not susceptible to electromagnetic interference.

In most aircraft systems that use digital sensors, the drawback is that the loss of one bit of information can be catastrophic. Therefore, there are typically redundant sensors for each critical function of the aircraft to be monitored. Thus if one sensor fails, the other sensor can be used. However, when two sensors are used, it is often difficult or impossible to tell which sensor is producing erroneous data and the data from both redundant sensors must be ignored. Therefore, most redundant sensor systems include at least three identical sensors in order to determine which sensor, if any, is faulty. This approach is both costly and increases the complexity and weight of the aircraft.

To reduce the complexity of redundant sensor systems, attempts have been made to design optical sensors that have built in fault detection so that the sensor itself can tell when the data being provided is erroneous. For example, attempts have been made to use Manchester encoding in the code plate so that every bit is encoded as a logical one to zero or zero to one transition. This technique has not proved satisfactory because twice the number of reflective segments must be encoded on the code plate, thereby requiring more spectral resolution and a decoding circuit with increased resolution. Alternatively, code plates have been designed to include parity bits, which can detect an odd number of errors. However, parity bits cannot detect the presence of an even number of errors in the code plate. Therefore, there is a need for an optical sensor system that is self monitored, can detect more than a single error and does not require additional complex encoding and decoding methods.

SUMMARY OF THE INVENTION

The present invention is directed to a self-monitored wavelength division multiplexed optical sensor. A light source produces broad band excitation light that is transmitted by a fiber optic cable to a remotely located wavelength division multiplexer. The wavelength division multiplexer splits the light into a plurality of spectral bands. These spectral bands are directed to an optical code plate having a pattern of reflective and absorptive segments on it that are indicative of a number of discrete positions. Light reflected from the optical code plate is recombined by the wavelength division multiplexer and transmitted to a detector circuit which analyzes the reflected light in order to provide an indication of the position of the object.

The code plate further includes a monitoring track that is indicative of the number of absorptive sections at each discrete position of the code plate. In a first embodiment, the monitoring track comprises a series of differentially sized reflective segments that are symmetrically disposed about a center line. The reflective segments in the monitoring track vary the power and bandwidth of the band of light that is directed onto the monitoring track. The power and bandwidth of the reflected light is measured at the detector circuit to provide an indication of an expected number of absorptive segments that should be present in the code plate. If the number of expected absorptive segments does not equal the number of absorptive segments detected, the optical sensor determines that an error exists in the code plate.

In an alternative embodiment, the monitoring track contains uniformly sized reflective segments having a position that is dependent on the number of absorptive segments at each discrete position of the code plate. By displacing the position of the reflective segments, the spectral peak of the band of light reflected from the monitoring track is changed. By determining the spectral peak of the reflected light, the sensor compares the number of absorptive segments detected with the number expected in order to determine if there is an error in the code plate.

It is therefore an object of this invention to provide a method of direct in-line fault detection that positively detects all single and multiple errors anywhere on an optical code plate.

It is another object of this invention to provide a simple method of encoding the monitoring information in a single track so that it occupies the least mount of spectral bandwidth.

It is a further object of this invention to provide a separate monitoring track not imbedded in the operational measurand for ease of decoding.

It is a further object of this invention to provide a monitoring track that is gray coded to minimize the error susceptibility that comes with multiple bit changes between adjacent positions.

It is yet another object of this invention to provide a method of built in fault detection for a digital optical sensor that does not require any additional component to the overall optical sensor system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a self-monitoring optical sensor that can detect one or more errors in an optical code plate.

Figure 1:
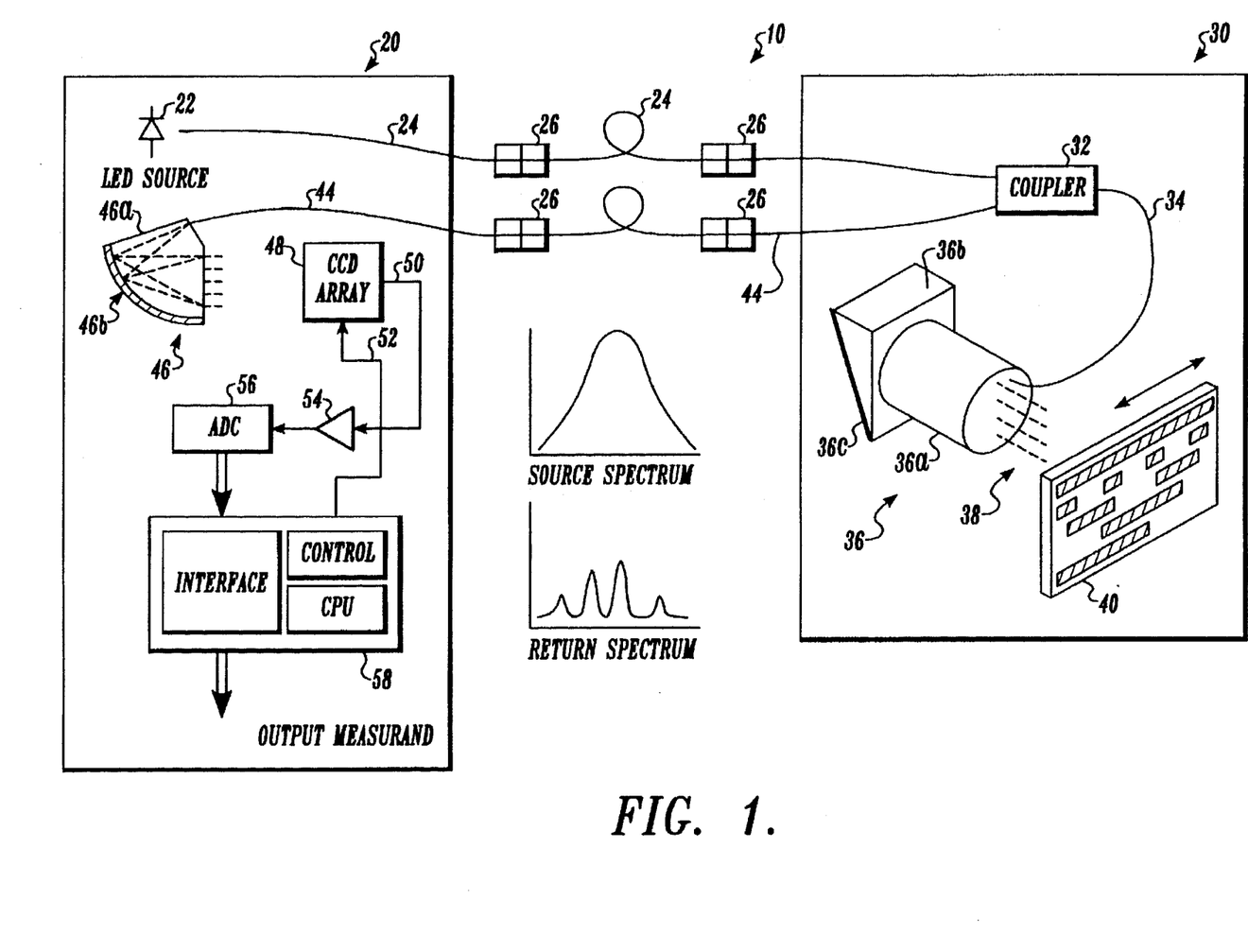
FIG. 1 is a block diagram of an optical sensor system according to the present invention.

Referring now to FIG. 1, an optical position sensor of the present invention includes a detector circuit 20 and a remotely located optical sensor 30. The detector circuit comprises a light source 22 that produces broad band excitation light. Suitable light sources include light emitting diodes (LED's) such the BLED series manufactured by ABB HAFO of Germany. However, other broad band light sources could also be used. The excitation light produced by the light source 22 is carried by an optical fiber 24 through one or more connectors 26 that are used to join optical fibers together.

The optical fiber 24 is connected to a 2to-1 coupler 32 which directs the excitation light through an optical fiber 34 that is coupled to a wavelength division multiplexer (WDM) 36. The WDM 36 comprises a gradient index fiber optic lens 36a that is optically bonded to a prism 36b with a diffraction grating 36c. The WDM 36 splits the excitation light received from the optical fiber 34 into a number of spectral bands 38. Each spectral band is directed onto a portion of an optical code plate 40. The details of the WDM 36 are well known to those of ordinary skill in the optical sensor arts.

Figure 2:
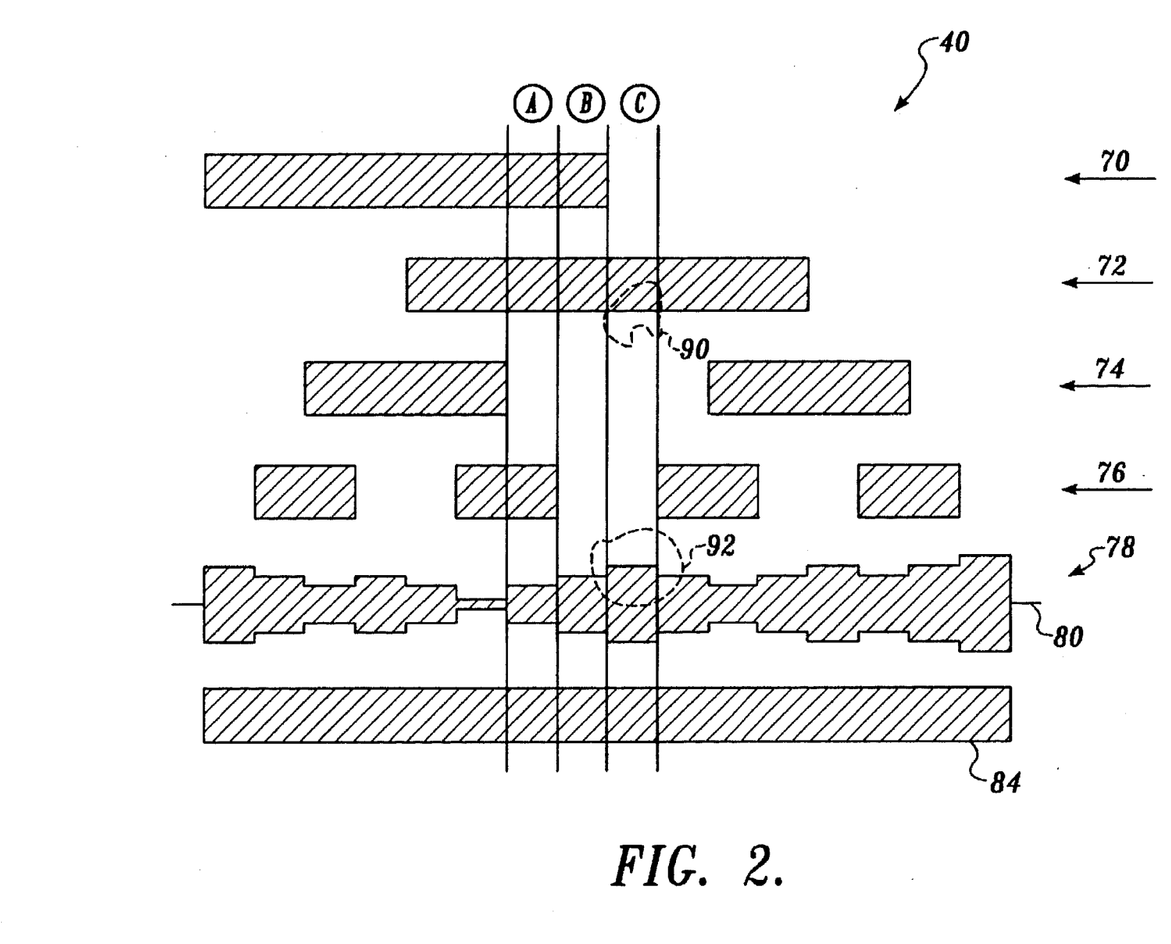
FIG. 2 is a diagram of a four bit code plate including a monitoring track that varies the power and bandwidth of a light beam to detect errors in the code plate.

As is best shown in FIGS. 2 and 5, the optical code plate includes a pattern of reflective and absorptive segments that either reflect the excitation light or allow the light to be absorbed by the code plate. The reflected spectral bands of light are gathered and recombined by the WDM 36 and channeled back into the optical fiber 34. The 2-to-1 coupler 32 directs the recombined light into a return optical fiber 44.

The return optical fiber 44 carries the recombined, reflected light to a second wavelength division multiplexer (WDM) 46 in the detector circuit 20. The WDM 46 comprises a prism 46a and diffraction grating 46b, which divides the light received on the optical fiber 44 into the number of spectral bands. The spectral bands produced by the WDM 46 are applied to an array of photodiodes or an image sensor such as a charge coupled device (CCD) array 48. The CCD array 48 is a linear array or area array (two dimensional) imaging sensor that produces an analog signal that is proportional to the mount of light received on each pixel of the sensor. A microprocessor based controller 58 generates timing and control signals on a set of leads 52 that direct the CCD array 48 to transfer the analog signal over a lead 50 to an amplifier 54 that increases the gain of the analog signal. The output of the amplifier 54 feeds the input of an analog to digital converter 56 that converts the analog signal into a corresponding digital signal. The series of digital signals produced is read by the controller 58 in order to produce an indication of the position of the optical code plate 40. Suitable CCDs include the TH7863 from Thomson-CSF of France. The operation of the CCD array 48 and the associated controller are considered to be well known to those of ordinary skill in the art.

FIG. 2 shows a first embodiment of a code plate 40 according to the present invention. As indicated above, the code plate 40 that comprises a plate made of glass or fused quartz. Disposed on the code plate are a series of tracks 70, 72, 74 and 76 that form a four bit binary code that is indicative of the position of the code plate. Although most digital sensors for flight control use 8 to 12 bits, a 4-bit code plate is shown to simplify the illustration. Each track comprises a number of reflective and nonreflective segments that are translated into binary digits by the detector circuit. In the example shown, the code plate is read vertically so that track 70 encodes the most significant bit in a four bit position code while track 76 encodes the least significant bit.

For ease of illustration, three discrete positions of the code plate are labeled as positions A, B and C. Read from top to bottom (with the convention that the reflective segments are treated as logical ones, and the absorptive segments are logical zeros), the digital code at position A is 1101, position B is translated to 1100 and the digital code at position C is 0100. As will be appreciated, the digital code formed by the pattern of reflective and transmissive segments is a "gray scale" code whereby only one bit changes at a time from one position to another.

Most optical sensors are used in environments that are subject to wide temperature variations as well as shock and vibrational stresses that can damage the code plate. The most common type of failure in an optical sensor is caused by contamination of the pattern of reflective segments on the code plate. The pattern may become obscured by dust, moisture condensation, or debris from sealing compound, thereby transforming a reflective segment into an absorptive segment. It is virtually impossible for an absorptive segment to be altered so that it becomes a reflective segment. Therefore the potential errors in the code plate are "asymmetrical."

To allow the detection of faults in the code plate, the optical sensor of the present invention uses a monitoring track that is encoded onto the code plate. The monitoring track signifies the number of absorptive segments at each discrete position of the code plate. As can be seen in FIG. 2, the monitoring track 78 comprises a number of differently sized reflective segments that are centered about a midline 80. The size of each reflective segment at each discrete position is proportional to the number of absorptive segments at that position on the code plate. For example, the number of absorptive segments at the positions A, B and C of the code plate increases from one to three. The size of the reflective segment at position A is selected to represent one absorptive segment, while the size of the reflective segments at positions B and C are selected to represent two and three absorptive segments respectively.

Below the monitoring track is a reference track 84 that comprises a continuous reflective segment of constant width. The reference track is used as a baseline to compensate for variations in excitation light intensity, losses in the optical fibers, etc.

To detect errors in the code plate, a spectral band of light produced by the WDM 36 (FIG. 1) is directed onto the monitoring track 78. The width of the reflective segment in the monitoring track modifies the power and bandwidth of the reflected light. The power and bandwidth is therefore determined in order to calculate a number of expected absorptive segments that should be detected in the code plate. If the number of absorptive segments detected does not match the number encoded into the monitoring track, the sensor determines that there is a fault in the code plate. Upon detection of a fault, the controller 58 (FIG. 1) transmits a signal to a remote computer system (not shown) that indicates the sensor is faulty.

Figure 3A:
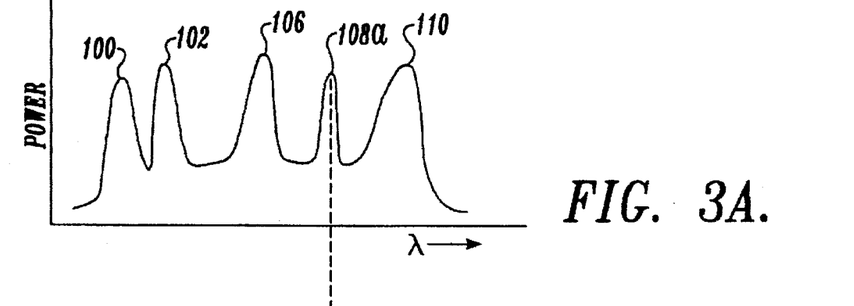
FIGS. 3A–3C are graphs showing the spectrum of reflected light at various positions of the code plate shown in FIG. 2.
Figure 3B:
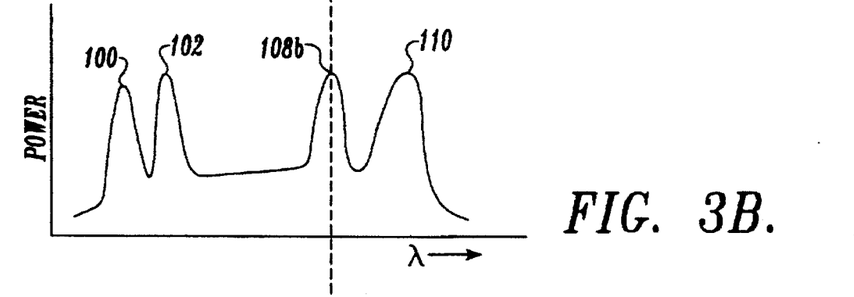
Figure 3C:
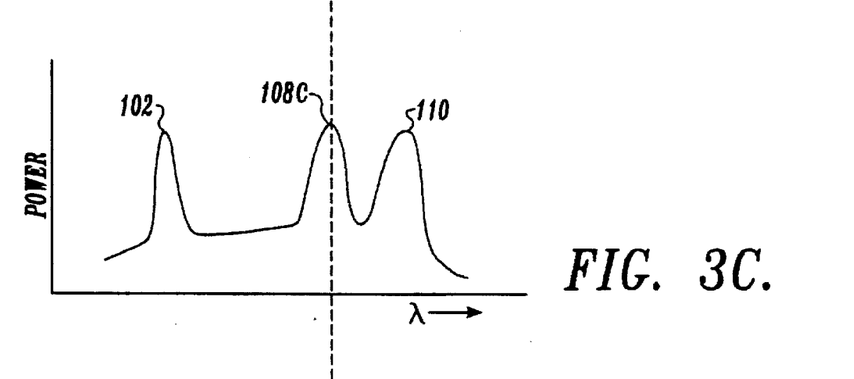

FIGS. 3A-3C are a set of graphs showing the spectrum of light reflected off the code plate for each of the positions A, B and C shown in FIG. 2. FIG. 3A is the spectrum of the reflected light when the code plate is at position A. The spectrum contains three peaks 100, 102 and 106 formed by the reflective segments in the tracks 70, 72 and 76. A peak 108a is created by the reflective segment in the monitoring track 78.

FIG. 3B is a graph of the spectrum of the reflected light when the code plate is at position B. The reflective segment in track 76 is not present at position B, therefore the peak 106 in the spectrum is diminished in size. Because the position code at position B has one more absorptive segment in it, the size of the reflective segment in the monitoring track has increased. The larger reflective segment creates a larger spectral band 108b in the spectrum of the reflected light.

At position C, the position code includes three absorptive segments. As can be seen in FIG. 3C, the peak 100 is diminished and only the peak 102 remains. The power spectrum contains a peak 108c, formed by the reflective segment in the monitoring track, that is larger than the peaks 108a and 108b.

Returning now to FIG. 1, the optical sensor transforms the received spectra into a binary code that is indicative of the position of the object coupled to the code plate, by integrating the light received on the CCD array. The light directed by the WDM 36 onto each track of the code plate has a predefined range of wavelengths. For example, light directed onto track 70 may have wavelengths in the range from 752 to 758 nanometers, while the light directed to track 74 has wavelengths in the range of 772 to 778 nanometers. When the received light is split into a plurality of spectral bands by the WDM 46 and directed onto the CCD array, each band of light will fall on a discrete area of pixels. By integrating the light signal in each area of pixels, the control circuit 58 determines how much light was reflected from a track in the code plate. The details of integrating the light from the CCD array in order to convert the received spectrum into a voltage level are published in the CCD device manual and are considered well known to those of ordinary skill in the art.

Figure 3D:
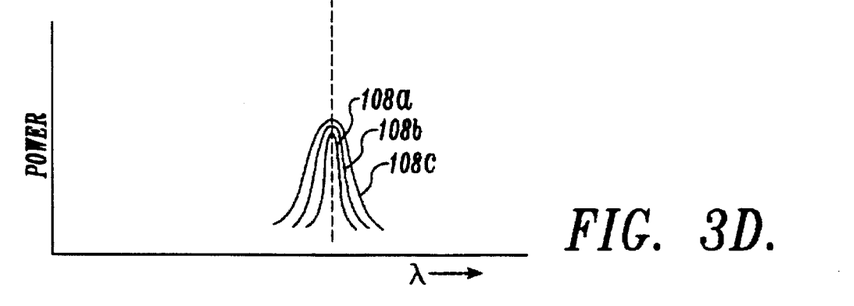
FIG. 3D is a graph showing the difference in the power and bandwidth of the light that is reflected off the monitoring track for the spectra shown in FIGS. 3A–3C.

FIG. 3D shows the differences in the peaks 108a, 108b and 108c of the spectra created by the differently sized reflective segments in the monitoring track. Each peak has the same center wavelength but has a different bandwidth and slightly different magnitude. To determine the number of absorptive segments that should be detected at each position of the code plate, the control circuit 58 (FIG. 1) integrates an area on the CCD array 48 around the center wavelength of the light that is directed onto the monitoring track. The integration provides an indication of the power of the light reflected off the monitoring track. The number of expected absorptive segments at each position on the code plate corresponds to a predefined power. If the power detected does not correspond to the number of absorptive areas actually detected, then the sensor determines that there is a fault in the code plate.

Returning again to FIG. 2, there is an illustration of how errors can occur in the code plate and how the monitoring track is used to detect them. If a contamination particle 90 obscures all or a portion of a reflective segment in track 72 at position C, the power of the received spectrum in that track's range of wavelengths (i.e., the peak 102 shown in FIGS. 3A-3C) will decrease. The controller 58 will therefore detect four absorptive segments. The signal received from the monitoring track 78 indicates that only three absorptive areas should be detected. Therefore, the sensor knows that there is a problem with the code plate at position C.

If a contamination particle 92 obscures a portion of the monitoring track 78 at position C, the power of the spectra received (i.e., peak 108 in FIGS. 3A-3C) will decrease thereby indicating that fewer absorptive segments should be detected. The control circuit detects this discrepancy and again determines that there is a problem with the code plate at position C.

If both contamination particles 90 and 92 obscure a portion of the tracks 72 and 78, the number of absorptive segments actually detected will increase and the power of the light reflected off the monitoring track will decrease (thereby indicating that fewer absorptive segments should have been detected). The control circuit again detects this discrepancy and determines that there is a fault in the code plate.

Figure 4:
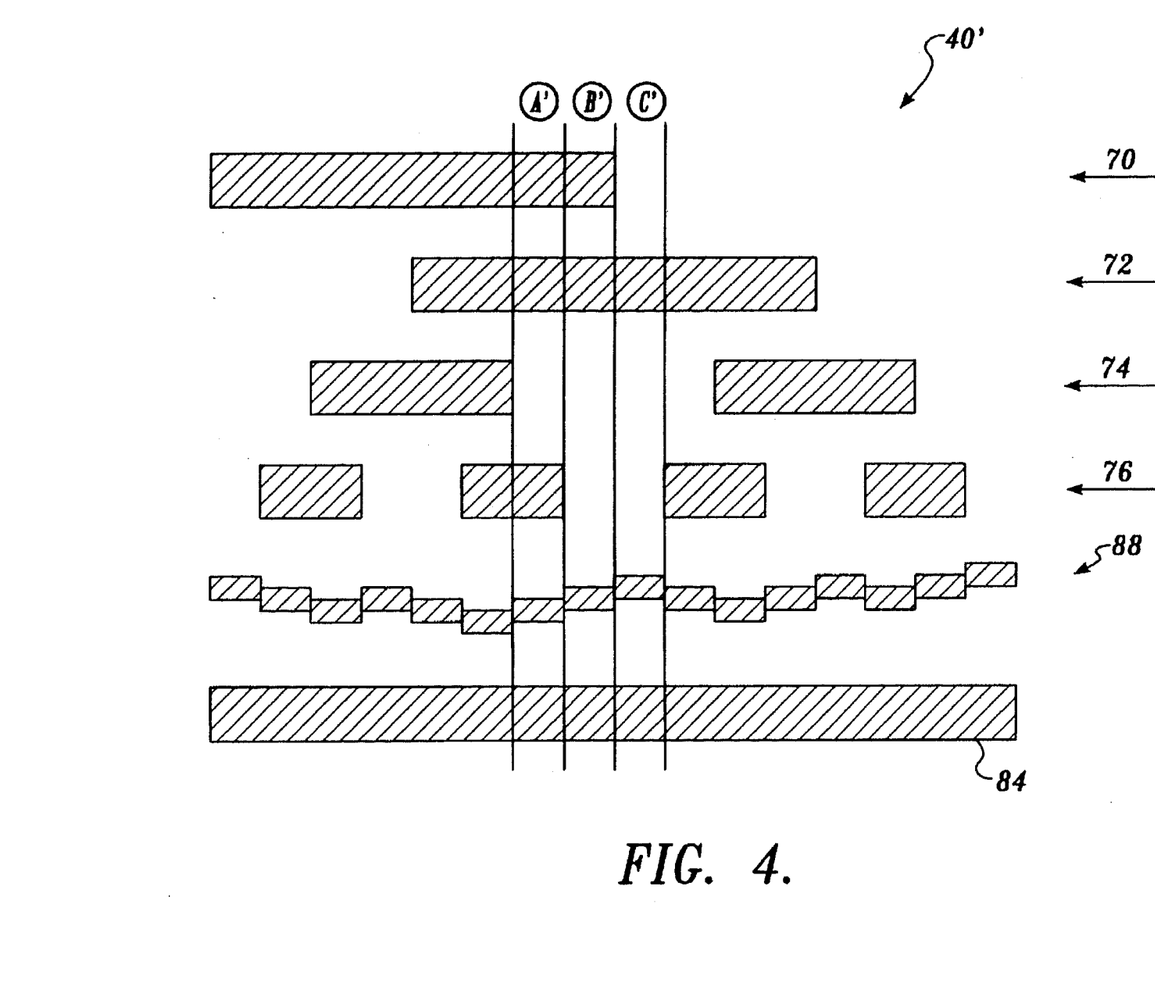
FIG. 4 is a diagram of a four bit code plate including a monitoring track that varies the center wavelength of a light beam to detect errors in the code plate.

A second embodiment of the code plate according to the present invention is shown in FIG. 4. The code plate 40' include the same tracks 70, 72, 74 and 76 as the code plate 40 shown in FIG. 2. The code plate 40' includes a monitoring track 88 that comprises a number of equally sized reflective segments. The position of each reflective segment in the monitoring track is varied depending on the number of absorptive segments present at each discrete position on the optical code plate. The effect of displacing the reflective segments in the monitoring track is to change the center wavelength of the light that is reflected off the monitoring track. Each center wavelength is assigned to represent a number of absorptive segments that should be present in the code plate. By determining the center wavelength of the light reflected off the monitoring track and associating the center wavelength with a number of expected absorptive segments and comparing the number to the number of absorptive segments actually detected, the optical sensor of the present invention can determine if there is a fault in the code plate.

Figure 5A:
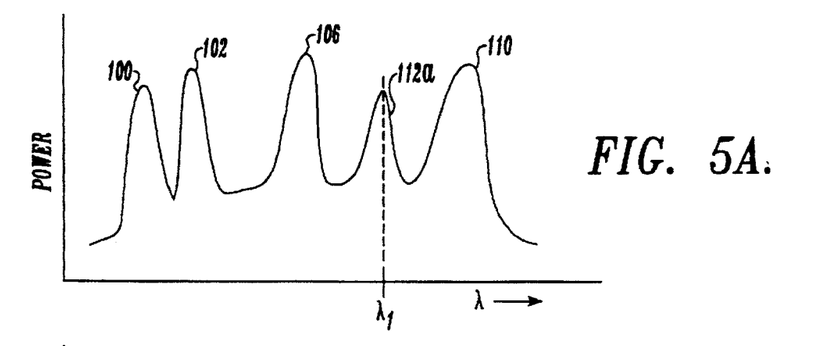
FIGS. 5A–5C are graphs showing the spectrum of reflected light at various positions of the code plate shown in FIG. 4.
Figure 5B:
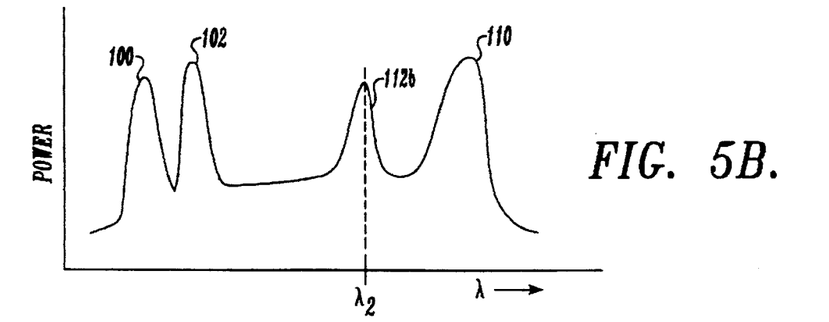
Figure 5C:
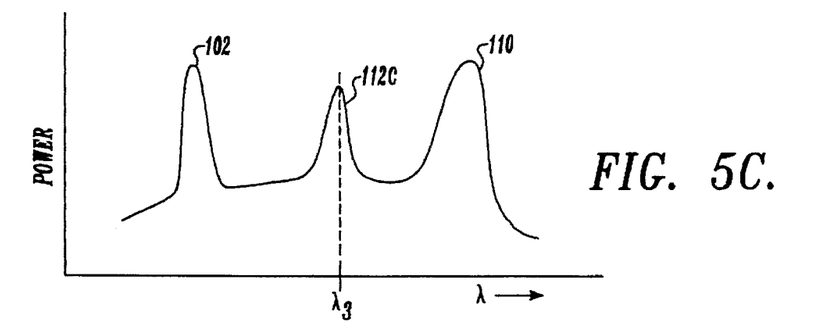

FIGS. 5A-5C are a series of graphs of the spectra of the reflected light for various positions of the code plate shown in FIG. 4. FIG. 5A is a graph of the spectrum of the reflected light when the code plate is in a position A'. The spectrum contains three peaks, 100, 102 and 106 created from each of the reflective segments in tracks 70, 72 and 76, respectively. The spectrum also contains a peak 112a, having a center wavelength of $\lambda_1$ that is created by light reflected off the monitoring track 88.

FIG. 5B shows the spectrum of the reflected light when the code plate is at a position B'. The peak 106 has diminished because the reflective segment in track 76 is not present at position B'. A peak 112b is created by light reflected off the monitoring track. The peak 112b has a center wavelength of $\lambda_2$ that is different from $\lambda_1$.

Finally, the spectrum shown in FIG. 5C only contains the peak 102 because only one reflective segment is present in the code plate at the position C'. The center wavelength of a peak 112c created by the reflective segment in the monitoring track has moved to $\lambda_3$.

Figure 5D:
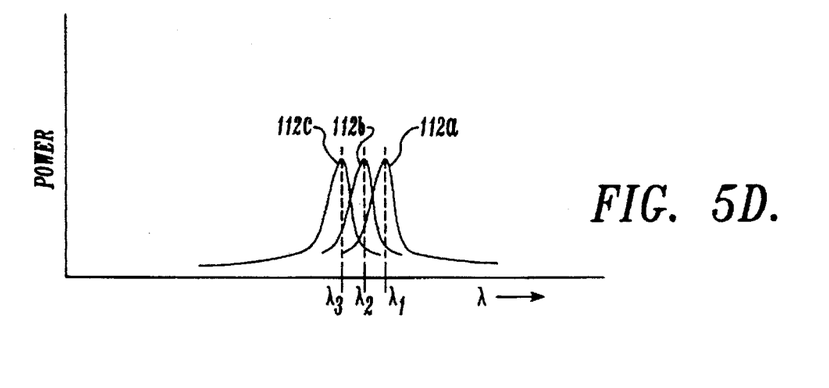
FIG. 5D is a graph showing variations in the center wavelength of the light reflected off the monitoring track for the spectra shown in FIGS. 5A–5C.

FIG. 5D is a comparison of the center wavelengths of the light reflected off the monitoring track for each of the positions A', B' and C'. The center wavelengths are moved depending on the number of absorptive segments that should be detected at each discrete position of the code plate. To compare the number of expected absorptive segments with the number detected, the controller 58 (FIG. 1) calculates the center wavelength of the band of light directed onto a potion of the CCD array that corresponds to the monitoring track. This center wavelength is than mapped to a number of expected absorptive segments. The control circuit then compares the number of absorptive segments detected with the number of absorptive segments expected in the code plate to determine if there is an error in the code plate. This method of encoding for fault detection can be extended for any number of data tracks as required by the application.

The code plate 40' can detect when a portion of the reflective segments become obscured in the same manner described above except that the center wavelength of the light reflected off the monitoring track is used as the benchmark.

As will be appreciated, it is not important which center wavelength corresponds to a particular number of absorptive segments. It is only important that the control circuit store the mapping of the center wavelength and a number of expected absorptive segments in order to make the comparison as the sensor is being used.

While the preferred embodiment of the invention has been illustrated and described, it will be appreciated that various changes can be made therein without departing from the spirit and scope of the invention. For example, although the present invention has been described with respect to reflective optical code plates, the invention can also be used with code plates where light is either transmitted through the code plate to a detector circuit (channel is ON, represents binary "1") or blocked (channel is OFF, represents binary "0") from reaching the detector. The code on the code plate is comprised of a number of opaque segments that block light and transmissive segments that allow light to pass through the code plate to a detector. In this case, the monitoring track would include a number of transmissive segments having a size or position that encodes an expected number of opaque segments at each position on the code plate.

As a further alternative, the monitoring track could encode the number of reflective tracks on the code plate. In this case, the size of the monitoring track should be inversely proportional to the number of reflective tracks in order to detect errors on the code plate as well as errors in the monitoring track.

Finally, although the code plates described above are designed to detect linear movement, it will be recognized that rotary code plates to detect angular movement could also be used. It is therefore intended that the scope of the invention be determined solely from the following claims.

The embodiments of the invention in which an exclusive property or privilege is claimed are defined as follows:

1. A self-monitoring optical sensor for determining the position of an object, comprising:

a light source;

a fiber optic cable positioned to receive light from the light source;

a wavelength division multiplexer, coupled to the fiber optic cable, for dividing light received on the fiber optic cable into a plurality of spectral bands;

a code plate coupled to the object whose position is to be sensed, wherein the code plate is positioned to receive the plurality of spectral bands created by the wavelength division multiplexer, the code plate defining a number of discrete positions that are marked by a plurality of tracks having reflective and absorptive segments that form a code indicative of each discrete position, the code plate further including a monitoring track that encodes an expected number of absorptive segments at each discrete position of the code plate; and a detector circuit that receives light reflected off the code plate and analyzes the effected light to determine the position of the object, wherein the detector circuit further detects a number of absorptive segments in the code plate at a discrete position and the number of expected absorptive elements that is encoded in the monitoring track for the discrete position in order to determine if there is a fault in the code plate.

2. The optical sensor of claim 1, wherein the monitoring track comprises a number of reflective segments having a size that is related to the number of absorptive segments at each position in the code plate.

3. The optical sensor of claim 1, wherein the monitoring track comprises a number of similarly sized reflective segments each of which has a position on the code plate that is a function of the number of absorptive segments at each discrete position in the code plate.

4. The optical sensor of claim 1, wherein the detector circuit includes:

a charge coupled device (CCD) imaging sensor;

a second wavelength division multiplexer that receives light that has been reflected off the code plate, wherein the second wavelength division multiplexer divides the received light into a plurality of spectral bands and directs each of the spectral bands on an area within the CCD imaging sensor; and a control circuit that produces a digital signal corresponding to the power of each spectral band that is directed onto the imaging sensor.

5. An optical code plate for use in an optical position sensor, comprising:

a plate having a plurality of tracks disposed thereon, each of the tracks comprising reflective and non-reflective segments that together form a code indicative of a number of discrete positions of the code plate, the plate further including a monitoring track that encodes an expected number of non-reflective segments at each discrete position of the code plate.

6. The optical code plate of claim 5, wherein the monitoring track comprises a number of non-reflective segments each of which has a size that is related to the number of segments at each discrete position of the code plate.

7. The optical code plate of claim 5, wherein the monitoring track comprises a number of similarly sized reflective segments, wherein each reflective segment has a position on the plate that is a function of the number of non-reflective segments at each discrete position of the code plate.

8. An optical code plate for use in a fault tolerant optical sensor, comprising:

a plate having a plurality of track disposed thereon, each track comprising opaque and transmissive segments that together form a code indicative of a number of discrete positions of the code plate, the plate further including a monitoring track that encodes an expected number of opaque segments at each discrete position of the code plate.

9. A code plate for use with an optical sensor, comprising:

a plate having a number of reflective and nonreflective tracks disposed thereon, each of the tracks being arranged to form a binary code that is indicative of a discrete position of the code plate, the plate further including a monitoring track that encodes a total number of reflective or nonreflective tracks at each position of the code plate.

10. The code plate of claim 9, wherein the monitoring track comprises a number of differently sized reflective segments, wherein the size of each reflective segment is proportional to the number of nonreflective segments at a discrete position on the code plate.

11. The code plate of claim 9, wherein the monitoring track comprises a number of differently sized reflective segments, wherein the size of each reflective segment is inversely proportional to the number of reflective segments at a discrete position on the code plate.

* * * * *